United States Patent [19]

Mieyal

[11] Patent Number: 4,573,304
[45] Date of Patent: Mar. 4, 1986

[54] HONEYCOMB FLOOR PANEL AND THE LIKE

[75] Inventor: David F. Mieyal, Strongsville, Ohio

[73] Assignee: Donn Incorporated, Westlake, Ohio

[21] Appl. No.: 555,142

[22] Filed: Nov. 25, 1983

[51] Int. Cl.$^4$ ............................................. E04C 2/08
[52] U.S. Cl. ...................................... 52/807; 52/668; 428/116
[58] Field of Search ............................ 428/116–120; 52/665, 807, 806, 785, 818, 820, 668, 596, 600, 661; 244/123

[56] References Cited

U.S. PATENT DOCUMENTS

| | | | |
|---|---|---|---|
| 1,887,814 | 11/1932 | Gall | 52/807 |
| 2,053,135 | 9/1936 | Dalton | 29/455 LM |
| 2,327,265 | 8/1943 | Herr | 428/119 |
| 2,680,501 | 6/1954 | Cunningham | 52/665 |
| 2,910,153 | 10/1959 | Campbell | 428/589 |
| 2,960,197 | 11/1960 | Langhans | 428/116 |
| 2,978,806 | 4/1961 | Herbert | 29/455 LM |
| 3,017,971 | 1/1962 | Christman | 428/118 |
| 3,091,845 | 6/1963 | Herman et al. | 29/455 LM |
| 3,106,503 | 10/1963 | Randall et al. | 428/117 |
| 3,108,367 | 10/1963 | Christman | 228/170 |
| 3,236,018 | 2/1966 | Graham et al. | 52/794 |
| 3,389,451 | 6/1968 | Speca et al. | 428/116 |
| 3,401,025 | 9/1968 | Whitney | 428/116 |
| 3,696,578 | 10/1972 | Swensen et al. | 52/792 |
| 4,067,156 | 1/1978 | Downing, Jr. | 52/126.6 |
| 4,292,375 | 9/1981 | Ko | 244/123 |

FOREIGN PATENT DOCUMENTS

| | | | |
|---|---|---|---|
| 224252 | 12/1956 | Australia | 52/807 |
| 863601 | 2/1971 | Canada | 52/686 |
| 600010 | 11/1959 | Italy | 52/807 |
| 447568 | 3/1968 | Switzerland | 52/126.6 |

Primary Examiner—James L. Ridgill, Jr.
Attorney, Agent, or Firm—Pearne, Gordon, Sessions, McCoy, Granger & Tilberry

[57] ABSTRACT

Honeycomb floor panels for use in elevated floors or the like are disclosed. The honeycomb structure provides similar metal strips providing lateral cuts along one edge providing angulated tabs. The angulation of the tabs provides an angulated throat having a width substantially greater than the thickness of the strips so that the strips can be assembled in an interfitting relationship while the strips of the two arrays are angulated with respect to each other. After assembly, the arrays are moved to a substantially perpendicular position, and in such position a tight fitting relationship is achieved to eliminate looseness. Such honeycomb is provided, in accordance with one embodiment, with upper and lower metal sheets which are welded or otherwise fastened to the honeycomb itself. In such embodiment, an additional upper surface sheet is provided to prevent denting and to distribute concentrated loads to prevent crushing of the honeycomb. Sound deadening is provided between the two upper sheets. In another embodiment, the honeycomb only extends a portion of the distance from the bottom of the panel and is embedded at its upper edge in a layer of lightweight concrete. The concrete provides the load bearing surface of the panel.

13 Claims, 12 Drawing Figures

HONEYCOMB FLOOR PANEL AND THE LIKE

BACKGROUND OF THE INVENTION

This invention relates generally to floor panel structures, and more particularly to a novel and improved floor panel and the like utilizing honeycomb, and to a novel and improved honeycomb structure.

PRIOR ART

Elevated floors which comprise floor panels supported at their corners on pedestals are well known. Such floors, often referred to as "access floors" or "computer floors," provide an underfloor space along which services, such as cables, ducts, and piping, can extend. Generally, the individual panels are removable to provide easy access to the space beneath the floor.

Generally in the past, panels for such floors have been formed of metal sheets which are stamped or shaped to provide an upper load surface and a lower support surface spaced from the load surface to provide a beam system. Examples of such panels are illustrated in U.S. Pat. Nos. 3,236,018 and 3,696,578.

It is also known to produce such panels of reinforced cement, as illustrated in U.S. Pat. No. 4,067,156. Further, the use of honeycomb between spaced sheets to provide a lightweight panel system is known, as illustrated in U.S. Pat. Nos. 2,910,153; 3,017,971; and 3,108,367. Such honeycomb panels have generally utilized a honeycomb material in which the various elements of the honeycomb are first interconnected to form a stable piece of honeycomb, and subsequently the honeycomb is laminated to surface sheets to provide a composite panel structure.

SUMMARY OF THE INVENTION

There are a number of aspects to this invention. In accordance with one important aspect of the invention, a composite panel is formed with a novel and improved honeycomb structure. Such honeycomb comprises a plurality of separate interfitting strips. Each strip is formed with a plurality of slots extending from one edge formed by slitting the strip and bending back the strip material on one side of the slot to provide an angulated tab. In such slitting operation, none of the strip material is removed, but by bending the tab back, the slit is provided with an angulated throat having a width substantially greater than the thickness of the strip.

Such angulated throad permits the strips to be easily assembled while the strips are in an angulated position. After assembly, the strips are moved to a position perpendicular to each other. In such perpendicular position, the angulated tabs cooperate with the opposed edge of the slit to tightly grip the opposite sides of the strip extending therethrough and the assembled strips are tight and free from any looseness. Subsequently, the honeycomb is connected to at least one cover sheet and is maintained in position with the strips in their tight perpendicularly extending position.

In accordance with another aspect of this invention, the honeycomb is assembled in a novel and improved manner in panels for access floors.

In one illustrated embodiment, the honeycomb is secured to cover sheets by adhesive located at the intersection of the strips and a very strong, rigid, lightweight panel is provided.

In another embodiment, the honeycomb strips are welded to upper and lower cover sheets of substantially uniform thickness, and a surface sheet is laminated to the upper cover sheet to provide additional stiffness to prevent denting. Preferably, the surface sheet is secured to the adjacent cover sheet with a material which, in addition to laminating the two sheets together, also provides a very effective sound-deadening structure.

In still another embodiment, the honeycomb is again secured by adhesive or welding to the lower cover sheet and extends only part-way to the opposite panel surface. In such embodiment, a lightweight concrete layer is provided for the panels' upper surface, and the honeycomb is embedded at its upper edge in the lower side of the concrete. In such embodiment, low cost concrete is combined with the honeycomb to provide a very rigid, strong, lightweight panel.

In all of the embodiments, a lightweight, lowcost, improved panel is provided which is particularly suited for access floors.

These and other aspects of this invention are illustrated in the accompanying drawings, and are more fully described in the following specification.

DETAILED DESCRIPTION OF THE DRAWINGS

Figure 1:
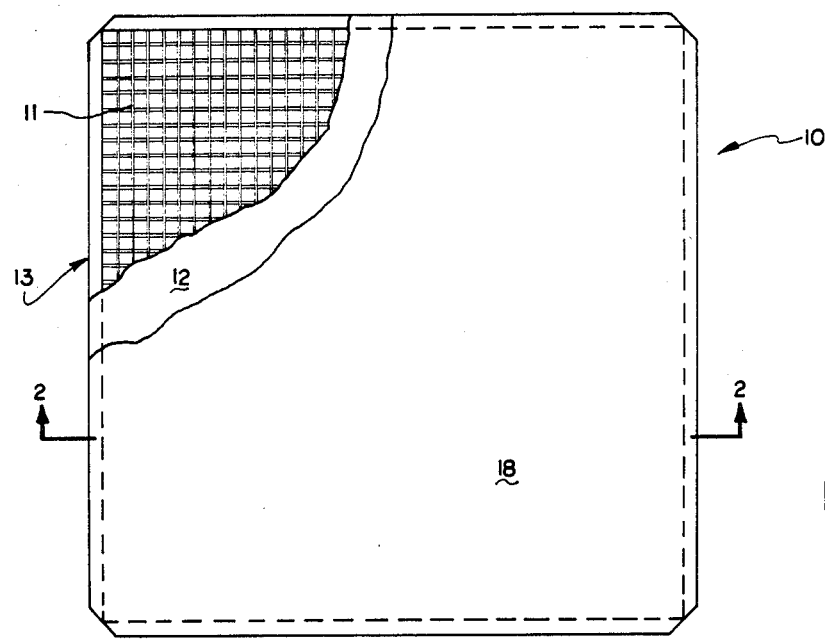
FIG. 1 is a plan view of a first embodiment of this invention, illustrating a honeycomb panel for an access floor, in which the honeycomb is welded to upper and lower cover sheets and in which an upper surface sheet is laminated to the upper cover sheet to provide dent resistance and sound-deadening.
Figure 2:
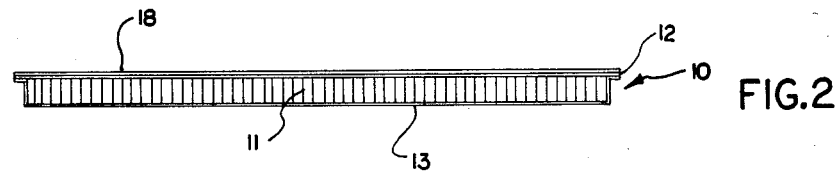
FIG. 2 is a cross section, taken along line 2—2 of FIG. 1.
Figure 3:
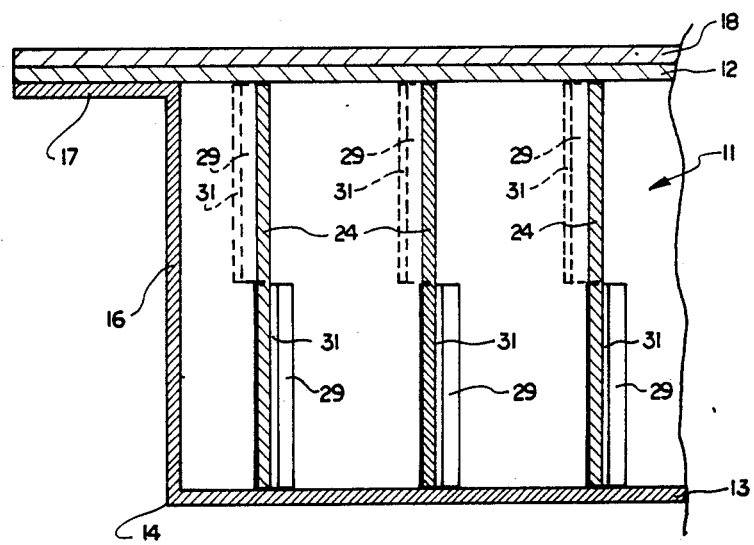
FIG. 3 is an enlarged, fragmentary cross section illustrating in greater detail the structure of FIG. 2.

In the first illustrated embodiment of this invention, a square, rectangular floor panel 10 is disclosed, which includes a honeycomb assembly 11 enclosed within two metal cover sheets 12 and 13. The lower cover sheet 13 extends along the bottom side of the honeycomb assembly to edges 14 and then extends up along the side edges of the honeycomb assembly, along upstanding walls 16, to lateral flanges 17. Thus, the lower cover sheet is shaped as a shallow pan which extends along the lower side of the honeycomb assembly and up along the side edges thereof.

The upper sheet 12 is a flat sheet which extends along the upper side of the honeycomb assembly 11 and out along the lateral flanges 17 to complete the enclosure of the honeycomb assembly 11. The two cover sheets 12 and 13 are secured to the honeycomb assembly along the adjacent faces thereof by either adhesive or welding, as discussed in greater detail below. Further, the upper cover sheet 12 is preferably welded or otherwise secured to the flange 17 along the overlapping portions thereof to provide a unitary structure.

A surface sheet 18 is secured to the side of the cover sheet 12 remote from the honeycomb assembly 11, and provides the surface of the panel which, when the panel is used on an elevated floor, is the load surface of the panel. Such surface sheet 18 is preferably laminated to the cover sheet 12 by an adhesive which, in addition to providing the connection between the two sheets, provides a sound-deadening function when the surface sheet is a metal sheet. One satisfactory sound-deadening adhesive is an elastomeric heat-activated cement.

The surface sheet 18 cooperates with the cover sheet 12 to provide a surface which is resistant to denting and which distributes the loads applied thereto over sufficient area to prevent crushing of the honeycomb assembly along those portions adjacent to the application of the loads. When the two cover sheets 12 and 13 are welded to the honeycomb assembly as discussed below, the thickness of the two sheets 12 and 13 is substantially equal, and is preferably in the order of 0.015 inch in a 2'×2° panel. In such instance, the thickness of the sheets 12 and 13 is selected so that the lower cover sheet 13 provides sufficient strength in tension to support the expected loads. The cover sheet 12 of such thickness required by the welding, however, would be susceptible to denting, so the surface sheet 18, if formed of metal, is, in such example, about 0.030 inch in thickness. Such a panel, when the honeycomb is constructed from arrays of strips about 0.012 inch thick as described in detail below, exhibits good strength and satisfactory rigidity.

The honeycomb assembly provides a very good interconnection between the two sheets to maintain them in a proper spaced relationship so that a very strong box beam structure is provided, which can be quite light for a given load rating. It should be understood that when the panels in accordance with this invention are used in an elevated floor structure, the panels are supported only at their corners on pedestals, such as the pedestal illustrated and described in U.S. Pat. No. 4,113,219. Thus, the panel must be capable of supporting substantial loads when supported only at the corners, and be capable not only of withstanding area loading but also of supporting substantial concentrated loads or dynamic rolling loads applied at any location along the upper surface of the panel.

Figure 4:
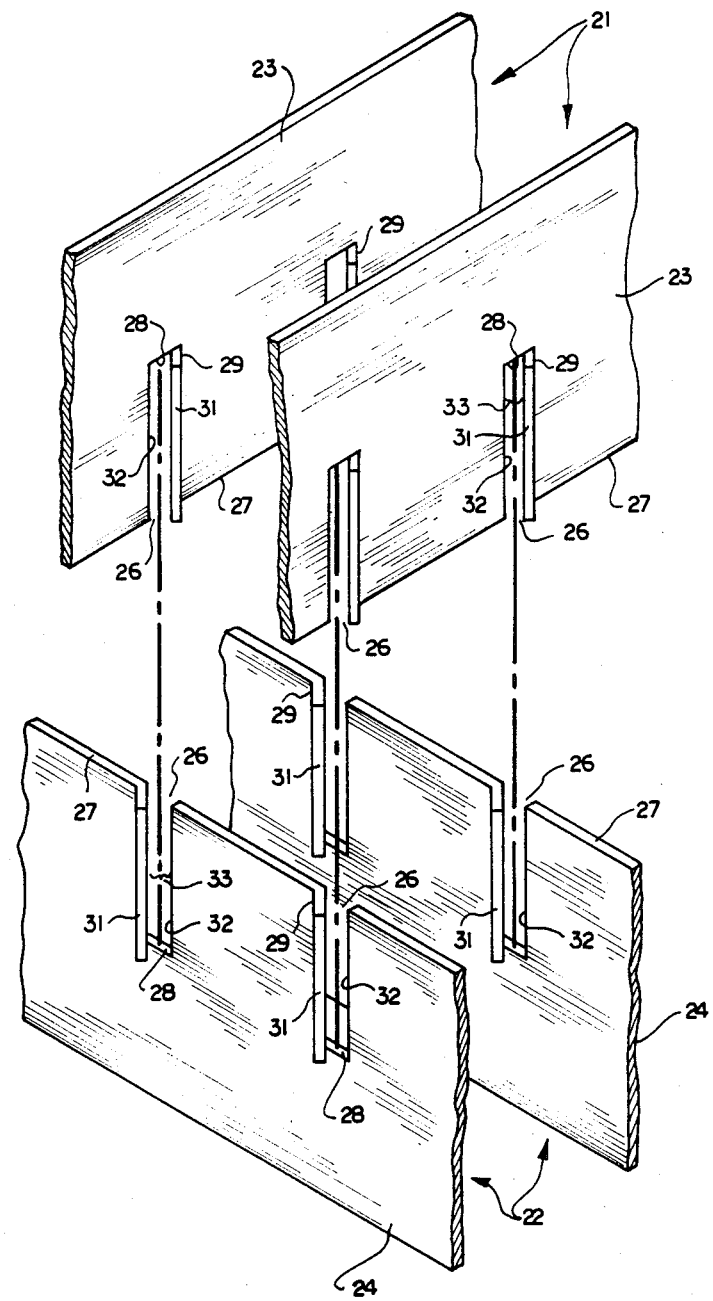
FIG. 4 is an enlarged, exploded perspective view of the preferred honeycomb structure in accordance with this invention, illustrating strips prior to assembly and illustrating the angulated throat provided in each strip.
Figure 5:
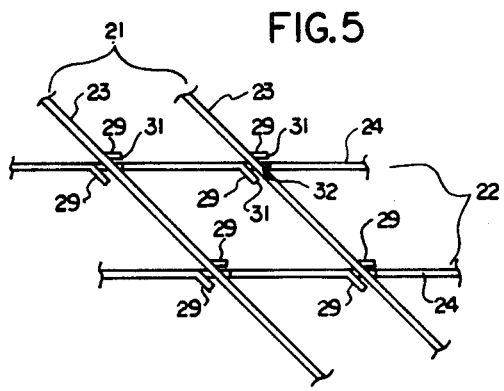
FIG. 5 is a fragmentary plan view, illustrating the strips of the honeycomb in the position in which they are first assembled in which the two arrays of strips are angulated with respect to each other to allow easy assembly.
Figure 6:
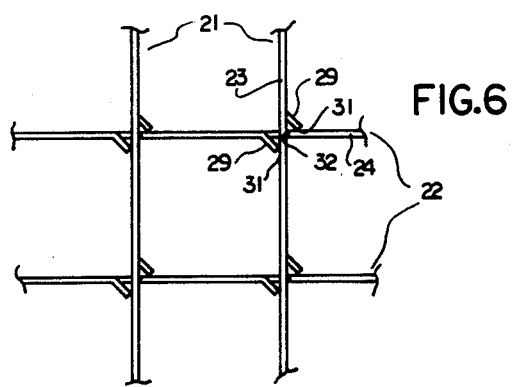
FIG. 6 is a fragmentary plan view, similar to FIG. 5 but illustrating the positions of the two arrays when they are moved to a position perpendicular to each other.

Reference should now be made to FIGS. 4 through 6, which illustrate the structural detail of a preferred honeycomb structure for use in panels in accordance with this invention. Such honeycomb includes two arrays 21 and 22 of parallel, thin metal strips 23 and 24, respectively. Preferably, the strips 23 and 24 are identical. Such strips extend the full width of the assembly and have a strip width equal to the thickness of the assembly 11. Each strip is formed with a plurality of slits 26 at uniform intervals along their length. When the strips 23 and 24 are identical, each slit extends inwardly from one longitudinal edge 27 and perpendicularly thereto through a distance slightly greater than one-half the width of the strip, and terminates at an inner slit end 28.

The material of the strips 23 and 24 along one side of the slit is bent out of the plane of the strip at an angle to provide an angulated tab 29 extending to a tab edge 31. The opposite edge of the slit provides an opposed edge 32 which remains in the plane of the strips and is placed from the edge 31 to provide an angulated throat 33 having a width substantially greater than the thickness of the strips 23 and 24.

The two arrays of strips 21 and 22 are assembled to produce the honeycomb assembly, as illustrated in FIG. 5, in which the strips 23 of the array 21 are positioned in an angulated position with respect to the strips 24 of the array 22 so that the respective strips are aligned with the angulated throat and can be easily moved together until the uninterrupted portion of the strip 23 above the ends of the associated slits 28 are positioned within the throats of the slits formed in the strips 22 and similarly, the uninterrupted portions of the strips 22 beyond the ends 28 of the slits therein are positioned in the throats of the strips 23.

Because the various strips are angulated to be in alignment with the angulated throats, and because the throats have a width substantially greater than the thickness of the strips, such assembly is relatively easy to accomplish. After the two arrays of a given honeycomb assembly are assembled in the angulated position, the arrays are moved while assembled to a position in which the strips of the two arrays extend perpendicularly to each other, as illustrated in FIG. 6. In such position, the edges 31 of the tabs 29 engage the through-extending portion of the strips of the other array, and hold them in tight engagement with the associated edges 31. This is because the tabs 29 are positioned so that the spacing between the edges 31 and 32 in the direction of the plane of the strips is at least as small as the thickness of the strips, even though the angulated throat width is substantially greater than such thickness. Thus, when the two arrays are moved to a position perpendicular to each other, the strips are tightly engaged and form a tight assembly in which no looseness exists. In fact, it is preferable to position and size the tabs so that the longitudinal spacing between the edges 31 and 32 is slightly less than the thickness of the strips to ensure that a tight condition will exist when the two arrays are positioned perpendicularly to each other. In such instance, because the edges 31 of the tabs are laterally offset from the edges 32, the strips and tabs deflect slightly as the arrays are moved to the perpendicular position so that a tight joint is provided without requiring extremely close tolerances.

The slits 26 are preferably formed as a simple shearing operation using a cutter resembling a chisel which cuts the material and bends back the tab in a single operation without removing any metal from the strips.

The shearing operation is conducted so that the tab 29 is of sufficient width and is sufficiently deflected so that the angulated throat is substantially greater in width than the thickness of the strip and so that when the strips are moved to the perpendicular position, the longitudinal width of the slit is slightly less than the thickness of the strip material being used. If thicker strip material is used, the tab can be made either slightly wider or bent back at a greater angle to adjust the longitudinal spacing or width of the slit to accommodate different metal thicknesses.

This type of honeycomb structure lends itself to automated production without excessive tooling. It should be recognized that after the honeycomb is assembled, various strips in the array are not interconnected except for the interfitting relationship, and until the cover sheets are attached, the assembly is not permanently interconnected. Since the panel assembled with the honeycomb is rectangular, however, once the honeycomb assembly is positioned within the panel it is maintained in its position with the strips and the arrays extending perpendicularly to each other by the engagement of the ends of the strips with the upstanding walls 16.

Two different systems are illustrated for connecting the honeycomb assembly to the cover members. The first involves welding, and is illustrated in FIGS. 7-9, and the second involves an adhesive, and is illustrated in FIG. 10.

Figure 7:
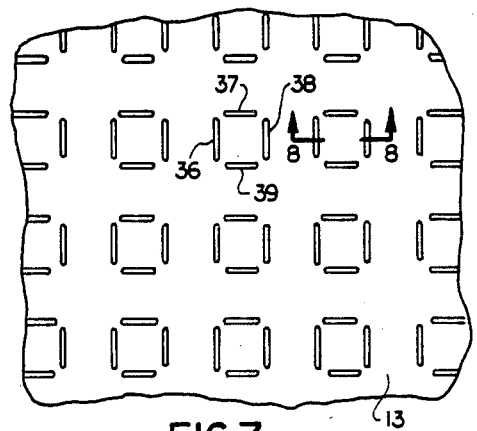
FIG. 7 is an enlarged, fragmentary view of one cover sheet formed with a pattern of narrow projections to facilitate the welding of the sheet to the honeycomb structure.
Figure 8:
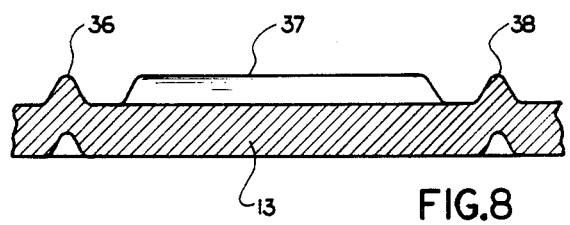
FIG. 8 is a greatly enlarged cross section, taken along line 8—8 of FIG. 7.
Figure 9:
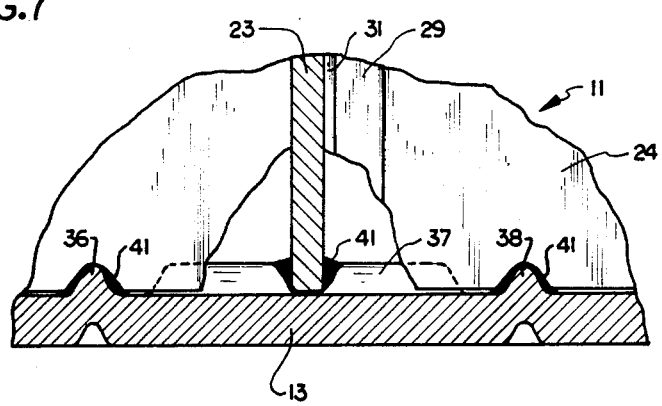
FIG. 9 is a view similar to FIG. 5, but illustrating the cover sheet welded to the honeycomb.
Figure 10:
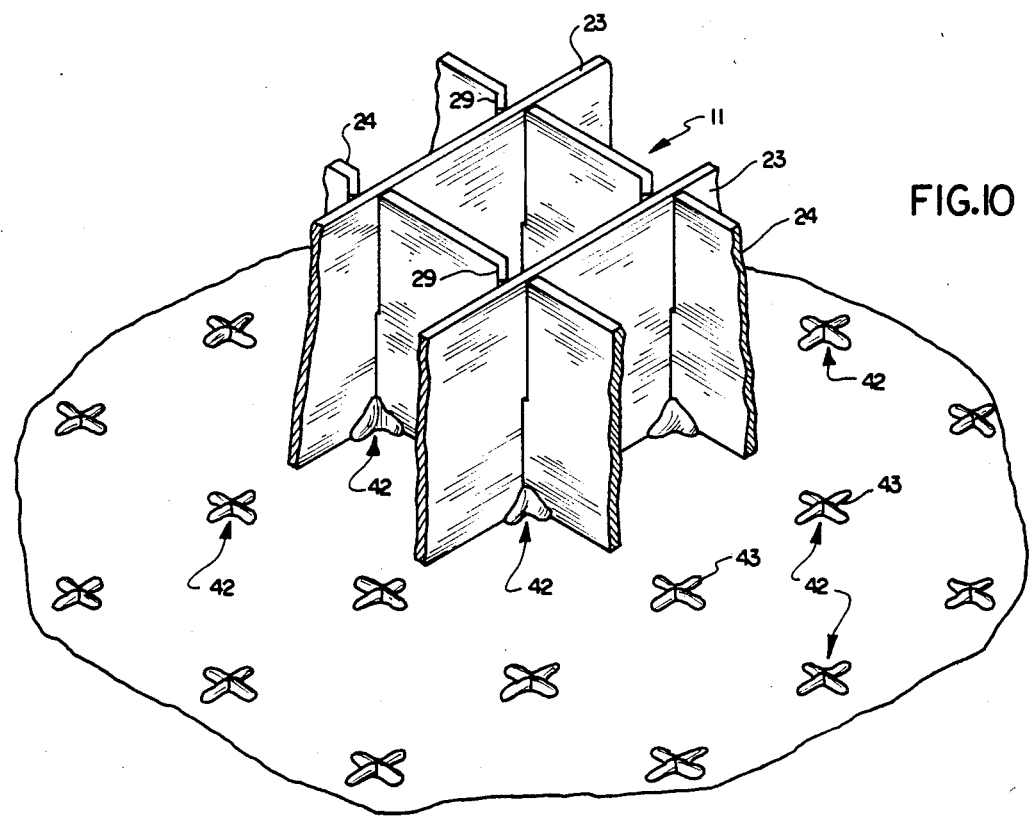
FIG. 10 is an enlarged, fragmentary perspective illustrating an embodiment in which the honeycomb is secured to the cover sheets by adhesive located at the intersections of the strips.

Referring to FIGS. 7 through 9, the welded connection between the cover sheets and the honeycomb assembly is accomplished by providing the cover sheets 12 and 13 with embossed projections. Since the projections on both sheets are the same, only the structure of the lower cover sheet 13 will be discussed in detail, with the understanding that it applies equally to the corresponding structure of the cover sheet 12.

The cover sheet 13 is preferably formed with a pattern of small, elongated projections, in which there are four upstanding projections 36 through 39 formed symmetrically about the intersecting joints between the strips of the array. Thus, the pattern provides four projections 36 through 39 in a pattern in which one group of four projections is located at each intersection of the honeycomb strips. If, for example, the slits are formed so that the assembled honeycomb defines cells one-half inch square, the pattern of projections is arranged so that each pattern of four projections is one-half inch on center from the adjacent pattern in each direction.

Preferably, the opposed projections 36 and 38 and the opposed projections 37 and 39 in such instance are about one-quarter inch apart and each pattern is spaced about one-quarter inch from the next adjacent group. Such projections are embossed in the metal forming the cover members, as illustrated in FIG. 8, with each projection being relatively narrow but elongated.

The welding operation is provided by positioning the honeycomb assembly 11 with the intersections between the strips located substantially in the center of each pattern associated therewith, and while pressing the sheets tightly against the honeycomb, electrical current is applied to cause a spot-type weld or wire-type weld between the cover sheet and the strips on each side of the intersection or joint therebetween, as illustrated in FIG. 9. Thus, there are four separate and distinct welds formed around each intersection of the strips connecting each of the strips at two locations adjacent to each joint, as illustrated by the welds 41. By producing essentially point-type contact between the projections and the strips, it is possible to ensure that a good weld is provided at each desired location, and to weld the cover sheets to the honeycomb assembly without excessive heating and without requiring excessive current.

Because four separate welds are provided at each joint, with two on each strip, the strips having the adjacent slit 26 therein are welded on both sides of each slit to ensure that the free edges at the ends of the slits are securely positioned.

In order to assure that good welds are provided between the honeycomb assembly and both of the cover sheets 12 and 13, the thickness of the two sheets 12 and 13, where two sheets are provided as in the embodiment of FIG. 1, should be of similar or substantially the same thickness. This ensures that both covers will be properly welded at the same time. Thereafter, the facing sheet 18 is applied to provide the additional thickness required to prevent denting and the like.

Because the groups of projections involve four projections spaced from each other in a square pattern, a proper weld is ensured even if the tolerances during manufacture are such that the junctions between the strips and the projections are not perfectly centered. In fact, such junctions can be offset with respect to the center of each of the patterns of projections a substantial amount without presenting a condition in which adequate welding does not occur.

FIG. 10 illustrates an alternate method and structure for securing the cover sheets to the honeycomb assembly. In this embodiment, adhesive is used to bond the cover sheets to the honeycomb assembly 11. In accordance with this embodiment, the cover sheets are not embossed with projections but, rather, are simple, flat sheets of metal, and small quantities of adhesive 42 are deposited on the sheets at locations which coincide with the junctions between the strips 23 and 24 in a pattern as illustrated in FIG. 10. The cover sheets are then positioned against the honeycomb assembly, with the adhesive aligned with the junctions between the strips of the honeycomb assembly and the adhesive is cured while the sheets are pressed against the honeycomb to produce a permanent bond. Preferably, the adhesive is applied to the cover sheets in X-shaped globs 43 so that even if there is some misalignment between the globs of adhesive and the junction between the strips, a bond will be established between the sheet and each of the strips without the use of an excessive amount of adhesive.

Alternatively, in some cases, the adhesive may be applied to the edges of the honeycomb with doctor rolls or can be striped on the cover.

It has been established that panels incorporating the structure thus far described provide a very rigid, lightweight structure. For example, a square panel 2 feet on each side having an outside vertical dimension of 1 inch constructed of honeycomb with a strip thickness of 0.012 inch, cover sheets 0.024 inch thick, and a surface sheet 0.048 inch thick deflects only 0.035 inch under a center load of 1000 pounds when the panel is supported at its corners. Similarly, when an edge load is applied at the middle of the edge of 1000 pounds, the deflection caused by such load is only 0.050 inch. Further, such a panel has a total weight of 18 pounds. A comparable prior art panel formed of metal stampings weighs about 28 pounds, and is not as rigid as the panel incorporating this invention.

Figure 11:
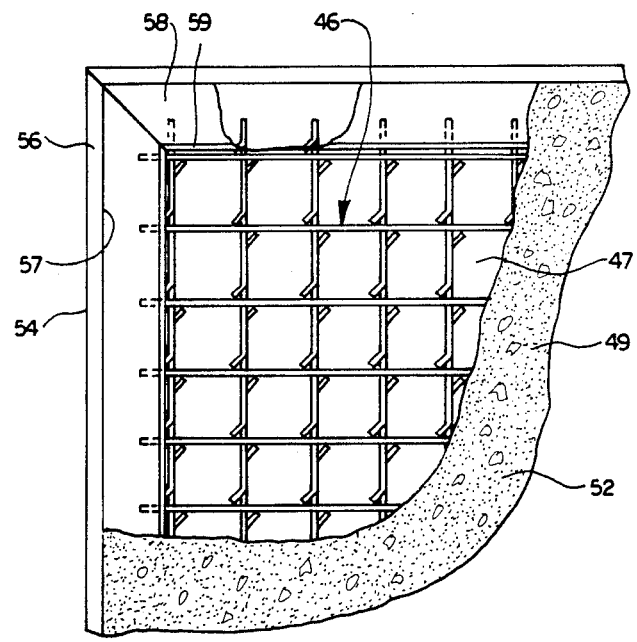
FIG. 11 is an enlarged, fragmentary plan view, with parts broken away for purposes of illustration, showing another embodiment in which honeycomb is combined with lightweight concrete.
Figure 12:
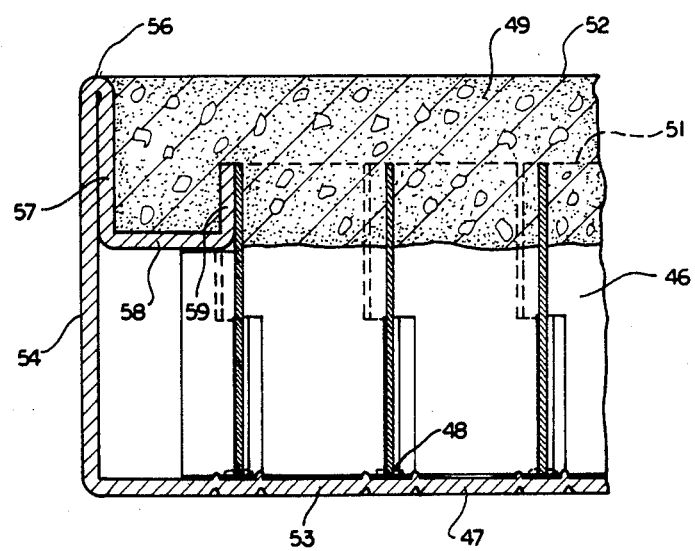
FIG. 12 is a fragmentary cross section of the embodiment illustrated in FIG. 11.

FIGS. 11 and 12 illustrate another embodiment of this invention. In this embodiment, a honeycomb assembly 46 having essentially the same interconnecting structure as the previously discussed embodiments is positioned within a sheet metal lower cover 47 and is connected thereto by welds at 48 similar to those described in detail in connection with FIGS. 7 through 9.

In this embodiment, however, only a single metal sheet is provided and the upper surface of the panel is provided by a layer of lightweight concrete 49. Further, the width of the strips forming the array is less than the full depth of the panel, so that the honeycomb assembly only extends from the lower cover sheet 47 to an upper edge at 51 spaced from the upper surface 52 of the concrete layer.

Preferably, the honeycomb extends into and is embedded in the lower portion of the concrete layer to provide a good interlocking connection. In one preferred panel, the total height of the panel is 1.314 inches, the layer of concrete 49 is ½ inch thick, and the honeycomb assembly projects halfway into the layer of concrete. Therefore, the honeycomb assembly is spaced from the upper surface of the panel by about one-quarter inch and is embedded in the lower side of the concrete about one-quarter inch. With this structure, the lower portion or planar portion 53 of the panel is in tension, and the concrete 49 is in compression when a load is applied to the upper surface 52. Therefore, concrete which can support compressive loads effectively is loaded in an efficient manner, and metal which can support tensile loads effectively is also loaded in an efficient manner. Because the free span of the strips of the honeycomb assembly has a height of only about 0.814 inch in a panel of this embodiment 1.314 inches deep, the honeycomb assembly itself can support substantial loads without crushing. Although the lightweight concrete is a preferred material for the layer 49 because of its low cost and substantially compressive strength, other castable material may be used in some instances.

Preferably, the cover sheet 47 is bent up along the periphery of the panel to provide upstanding walls 54 and is reversely bent at the upper edge 56 to extend back down along the sidewalls at 57 to double the thickness of the metal around the upper edges of the panel. From the depending wall portion 57, the metal is bent to provide an inwardly extending flange 58, and an upstanding interior wall 59 to produce a composite structure spaced from the upper surface of the panel which is filled with concrete of the layer 49 to interlock the edges of the metal to the edges of the concrete and prevent separation thereof when the panel is subjected to edge loading.

When the strips of the honeycomb assembly are formed of material 0.012 inch thick, the cover member is 0.015 inch thick, and the concrete has a density of 95 pounds per cubic foot, a 2'×2' panel weighs about 29 pounds and is able to withstand a center load of 1100 pounds with only 0.040 inch of deflection. Similarly, such a corner-supported panel, when loaded with a concentrated load along the edge of the panel midway between the corners of 1100 pounds, has only about 0.070 inch of deflection.

Even though the panels in accordance with this embodiment of the invention weigh more than an all metal panel, the cost of the panels is low because the cost of concrete per pound is substantially lower than the cost of metal per pound.

In accordance with this invention, a novel and improved honeycomb panel is provided which is relatively light in weight and low in production cost and which provides a very strong and reliable panel structure particularly suited for elevated floors and the like.

Although the preferred embodiments of this invention have been shown and described, it should be understood that various modifications and rearrangements of the parts may be resorted to without departing from the scope of the invention as disclosed and claimed herein.

What is claimed is:

1. A honeycomb structure comprising first and second arrays of similar strips of elongated, thin metal interfitting the other array to provide a honeycomb assembly defining a multitude of cells of rectangular cross section, said strips of said first array extending substantially perpendicular to said strips of said second array, said strips of each array providing a plurality of laterally extending slots extending from one edge thereof and spaced at intervals along the length thereof, each slot providing a tab along one side thereof formed of the material of said strip and inclined from the plane thereof in the same direction to a free edge, the other side of each slot being provided by an opposed edge of said material of said strip, said opposed edge and associated tab defining an angulated throat inclined with respect to said strip having a width substantially greater than the thickness of the material of said strip, said free edge of said tab and the associated opposed edge being spaced in the direction of the length of said strips by a distance at least as small as the thickness of said strips, said arrays being assembled while the strips in each array are angulated with respect to the strips in the other array in the direction of said angulated throat and after assembly being moved to a position in which the strips in said arrays extend perpendicularly to each other and tightly engage the sides of the slots of the other array, said arrays being permanently secured to a cover sheet along at least one edge thereof to maintain the strips in each array substantially perpendicular to the strips in the other array.

2. A honeycomb structure as set forth in claim 1, wherein said opposed edges are located substantially in the plane of said strips.

3. A honeycomb structure as set forth in claim 1, wherein a surface layer of castable material is provided along the side of said honeycomb assembly spaced from and opposite said cover sheet, said honeycomb assembly being embedded along one side thereof in said surface layer and providing a portion between said cover sheet and said surface layer which is free of said castable material, said surface layer providing substantial compressive strength and being stressed in compression when loads are applied to said structure against said surface layer.

4. A honeycomb structure as set forth in claim 3, wherein said surface layer is lightweight concrete, and upstanding walls extend from said cover sheet around the edges of said honeycomb assembly and are embedded in said layer of concrete.

5. A honeycomb structure as set forth in claim 4, wherein said honeycomb structure is a floor panel adapted to be supported at its corners.

6. A honeycomb structure as set forth in claim 1, wherein said cover sheet is secured to said arrays by adhesive located only at the intersection of said strips of said arrays.

7. A honeycomb structure as set forth in claim 6, wherein a second cover sheet is adhesively secured to said strips along the opposite edges thereof providing a panel with said honeycomb assembly enclosed by said cover sheets, said cover sheets providing laterally extending walls enclosing the edges of said honeycomb assembly, said laterally extending walls connecting said cover sheets together to provide a panel structure.

8. A honeycomb structure as set forth in claim 1, wherein said cover sheet is welded to said strips.

9. A honeycomb structure as set forth in claim 8, wherein said projections are formed in patterns of four projections substantially symmetrically positioned around said joints between said strips, said projections and strips being welded together on opposite sides of said joints, thereby positioning the edges of said strips on each side of said laterally extending slot.

10. A honeycomb structure as set forth in claim 8, wherein a second cover sheet is welded to the opposite side of said strips, said cover sheets having substantially the same thickness, and a surface sheet is secured to only one of said cover sheets on the side thereof remote from said honeycomb assembly to resist denting and to spread concentrated loads applied thereto over sufficient area to prevent crushing of said honeycomb assembly.

11. A honeycomb structure as set forth in claim 10, wherein said surface sheet is metal and is laminated to said one cover sheet by a thin sound-deadening layer.

12. A panel for elevated floors comprising a honeycomb assembly providing metal walls defining a multitude of separate small cells, a pair of spaced metal cover sheets secured to said honeycomb assembly along opposite sides thereof, a metal surface sheet, and a thin layer of non-metallic, sound-deadening material securing said surface sheet to said one of said cover sheets on the side thereof opposite said honeycomb, said cover sheets being substantially the same thickness, said cover sheets being welded to said honeycomb assembly and having insufficient thickness to effectively resist denting under concentrated loads to be supported by said panel, said surface sheets in cooperation with one cover sheet providing sufficient rigidity to prevent denting and crushing of said honeycomb when said concentrated loads are applied.

13. A panel as set forth in claim 12, wherein said sound-deadening material is an adhesive which absorbs vibration and thereby dampens sound.

* * * * *